United States Patent
Spång

(10) Patent No.: US 11,303,695 B2
(45) Date of Patent: Apr. 12, 2022

(54) FORCED IDENTIFICATION WITH AUTOMATED POST RESUBMISSION

(71) Applicant: Imperva, Inc., San Mateo, CA (US)

(72) Inventor: Daniel Spång, Solna (SE)

(73) Assignee: Imperva, Inc., San Mateo, CA (US)

( * ) Notice: Subject to any disclaimer, the term of this patent is extended or adjusted under 35 U.S.C. 154(b) by 0 days.

(21) Appl. No.: 17/084,656

(22) Filed: Oct. 30, 2020

(65) Prior Publication Data

US 2021/0337009 A1    Oct. 28, 2021

Related U.S. Application Data

(60) Provisional application No. 62/704,206, filed on Apr. 27, 2020.

(51) Int. Cl.
| | | |
|---|---|---|
| H04L 29/08 | (2006.01) | |
| H04L 67/02 | (2022.01) | |
| H04L 69/329 | (2022.01) | |
| H04L 29/06 | (2006.01) | |

(52) U.S. Cl.
CPC .......... *H04L 67/02* (2013.01); *H04L 63/0281* (2013.01); *H04L 63/0428* (2013.01); *H04L 69/329* (2013.01)

(58) Field of Classification Search
CPC . H04L 63/0281; H04L 63/0428; H04L 67/02; H04L 69/329; H04L 51/00
See application file for complete search history.

(56) References Cited

U.S. PATENT DOCUMENTS

| | | | | |
|---|---|---|---|---|
| 7,886,352 B2 * | 2/2011 | Pandrangi | ............. | H04L 63/083 726/12 |
| 8,051,465 B1 * | 11/2011 | Martin | ................... | H04L 63/12 726/3 |
| 8,218,759 B2 * | 7/2012 | Moffat | .................. | H04L 9/0643 380/28 |
| 8,613,089 B1 * | 12/2013 | Holloway | ........... | H04L 63/1458 726/23 |
| 2016/0140335 A1 * | 5/2016 | Proulx | .................. | H04L 63/083 726/6 |
| 2017/0243003 A1 | 8/2017 | Rapaport et al. | | |

\* cited by examiner

*Primary Examiner* — Chirag R Patel
(74) *Attorney, Agent, or Firm* — Nicholson, De Vos, Webster & Elliott, LLP

(57) ABSTRACT

A method by a web application layer proxy communicatively coupled between a client and an origin server for performing automated POST resubmission. The method includes intercepting a request by the client for a resource provided by the origin server, obtaining an interstitial page in response to receiving an indication from a bot detector component that the client needs to be identified, where the interstitial page includes challenge code for interrogating the client and code for automatically submitting a form included in the interstitial page if the client successfully acquires a token, encrypting a payload of the request, adding the encrypted payload to a hidden input field of the form included in the interstitial page, and sending the interstitial page with the encrypted payload added to the hidden input field of the form to the client as a response to the request.

20 Claims, 4 Drawing Sheets

FORCED IDENTIFICATION WITH AUTOMATED POST RESUBMISSION

CROSS-REFERENCE TO RELATED APPLICATIONS

This application claims the benefit of U.S. Provisional Application No. 62/704,206, filed Apr. 27, 2020, which is hereby incorporated by reference.

TECHNICAL FIELD

This disclosure relates to computer network security, and in particular to performing automated POST resubmission.

BACKGROUND

Automated web traffic is prevalent on the internet. The bots that generate this traffic come from a wide variety of sources, from harmless web crawlers to malicious hackers targeting government voter registration pages. It has been found that almost forty percent of collected internet traffic is generated by bots.

One way that websites, applications, and application programming interfaces (APIs) attempt to defend against automated users with malicious intent is through the use of a reverse proxy. A reverse proxy sits "in front" of web servers and forwards requests from clients (e.g. web browsers) to those web servers. When a reverse proxy receives a request for a web page from a client, the reverse proxy may send an analysis request to a bot detector component to analyze the client's request. The bot detector component may analyze the client's request to determine whether the client is operated by a bot or a human user and respond to the request by returning a suggested action. If this is the first request that the bot detector component has seen from the client then the bot detector component may return an indication to the reverse proxy that the client needs to be identified (a "forced identification" action). In response, the reverse proxy may send an interstitial page to the client that includes code for interrogating the client (e.g., which may involve fingerprinting the client (e.g., to uniquely identify the client) and performing some challenges (e.g., to ensure that the client is a real browser)). The client may execute the code which causes the client to send the results of the interrogation to the bot detector component (e.g., via the reverse proxy). The bot detector component may determine, based on the results of the interrogation, whether the client is operated by a bot. If the bot detector component determines that the client is not operated by a bot, then the bot detector component may generate and send a token to the client (e.g., via the reverse proxy). Once the client acquires the token, the client may reload the web page. As before, when the reverse proxy receives the client's request it may send an analysis request to the bot detector component to analyze the client's request but this time the bot detector component may return an indication to the reverse proxy that the request is allowed to be forwarded to the origin server since the client has acquired a valid token (and has been determined not to be operated by a bot). In response, the reverse proxy may send the client's request to the origin server.

This technique works well with GET requests, as any data attached to the GET request is in the uniform resource locator (URL) itself and is resent when the page is reloaded after the client acquires the token. However, this technique may not work consistently with POST requests because different types of clients (e.g., different types of web browsers) may handle reloads of POST requests differently. For example, some clients may display a pop-up dialog box asking the user if the user wishes to resubmit the POST data, which may be cumbersome for the user, while some clients may silently convert the POST request to a GET request, leading to loss of data.

DETAILED DESCRIPTION

Figure 1:
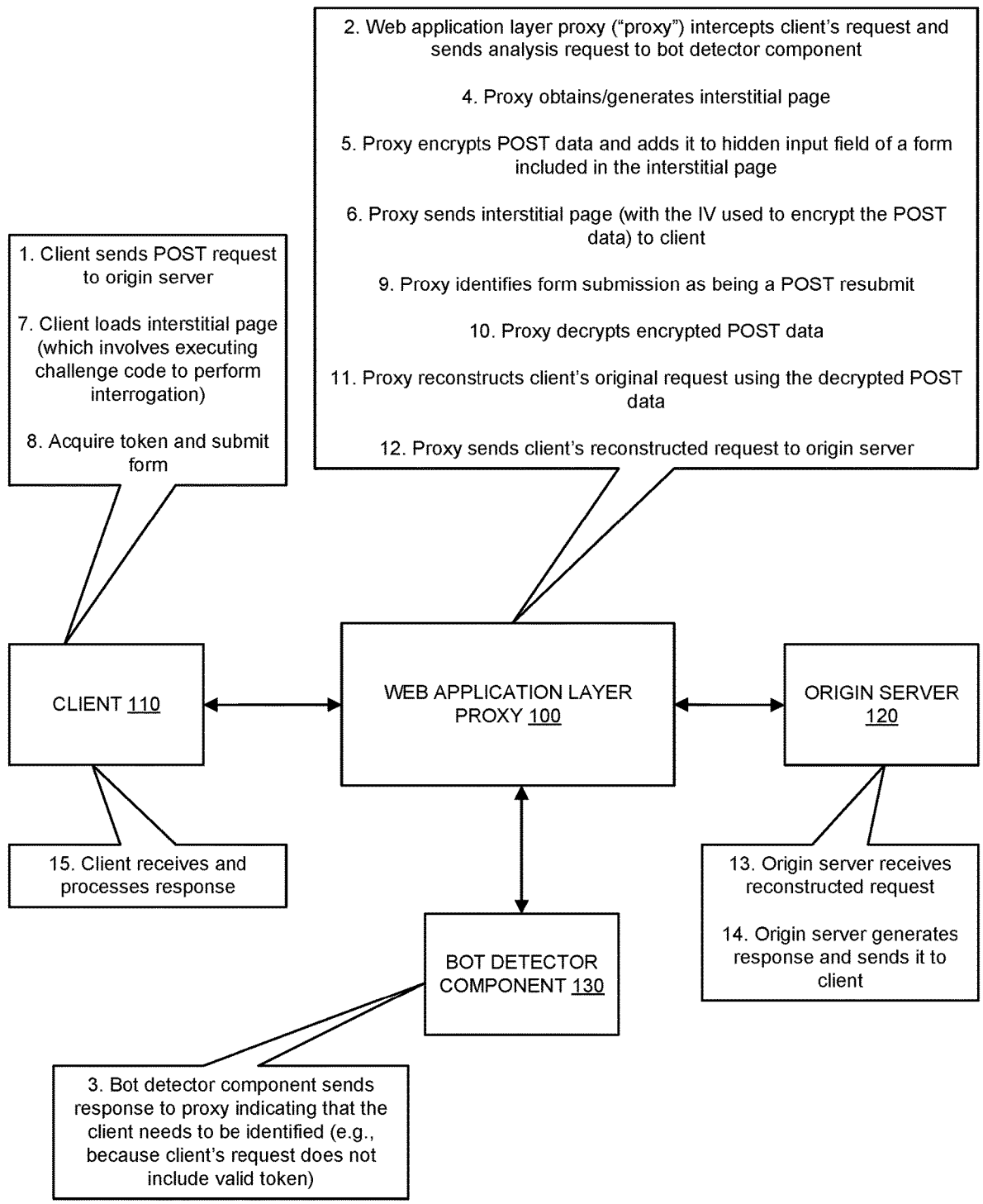
FIG. 1 is a block diagram of a system in which automated POST resubmission can be implemented, according to some embodiments.

In the following description, numerous specific details such as logic implementations, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

Bracketed text and blocks with dashed borders (e.g., large dashes, small dashes, dot-dash, and dots) are used herein to illustrate optional operations that add additional features to embodiments of the invention. However, such notation should not be taken to mean that these are the only options or optional operations, and/or that blocks with solid borders are not optional in certain embodiments of the invention.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In the following description and embodiments/claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other As used herein, a network device (e.g., a router, switch, bridge) is an electronic device that is a piece of networking equipment, including hardware and software, which communicatively interconnects other equipment on the network (e.g., other network devices, end stations). Some network devices are "multiple services network devices" that provide support for multiple networking functions (e.g., routing, bridging, and/or switching), and/or provide support for multiple application services (e.g., data, voice, and video).

As used herein, server end stations are network devices operable to execute or otherwise implement one or more servers providing content or services to clients. For example, server end stations may implement web application servers, application programming interface (API) servers, database servers, file servers, print servers, mail servers, gaming servers, application servers, and/or Domain Name System (DNS) servers.

As used herein, client end stations (e.g., workstations, laptops, netbooks, palm tops, mobile phones, smartphones, multimedia phones, Voice over Internet Protocol (VoIP) phones, user equipment (UE), terminals, portable media players, Global Positioning Satellite (GPS) units, gaming systems, set-top boxes) are network devices operable to execute or otherwise implement applications that, among other functions, can access the content and/or services provided by servers over a network (e.g., over a local area network (LAN), over the internet, and/or over virtual private networks (VPNs) overlaid on (e.g., tunneled through) the internet).

As mentioned above, existing techniques for protecting websites, applications, and application programming interfaces (APIs) against malicious bots such as the one mentioned above may work well with Hypertext Transfer Protocol (HTTP) GET requests, as any data attached to the GET request is in the uniform resource locator (URL) itself and thus is resent when the page is reloaded after the client acquires the token. However, this technique may not work consistently with HTTP POST requests because different types of clients (e.g., different types of web browsers) may handle reloads of POST requests differently. For example, some clients may display a pop-up dialog box asking the user if the user wishes to resubmit the POST data, which may be cumbersome for the user, while some clients may silently convert the POST request to a GET request, leading to loss of data.

Embodiments described herein allow bot detection to work consistently and securely for POST requests across different types of clients (e.g., without displaying a pop-up dialog and/or without loss of data) by introducing a technique that is referred to herein as "automated POST resubmission" instead of relying on page reloads. An embodiment is a method by a network device implementing a web application layer proxy communicatively coupled between a client and an origin server. The method includes intercepting a request by the client for a resource provided by the origin server, where the request is a POST request, sending an analysis request to a bot detector component to analyze the request in response to intercepting the request, generating an interstitial page in response to receiving a response from the bot detector component indicating that the client needs to be identified, where the interstitial page includes challenge code for interrogating the client and code for automatically submitting a form included in the interstitial page if the client successfully acquires a token, encrypting a payload of the request using an initialization vector and a secret key, adding the encrypted payload to a hidden input field of the form included in the interstitial page, and sending the interstitial page with the encrypted payload added to the hidden input field of the form to the client as a response to the request, where the response is sent with the initialization vector as a cookie. The method may further include receiving the encrypted payload from the client, where the encrypted payload is received from the client due to the client submitting the form included in the interstitial page after acquiring the token, decrypting the encrypted payload using the initialization vector and the secret key to recover the payload of the request, reconstructing the request using the recovered payload of the request, and sending the reconstructed request to the origin server. Various embodiments are further described with reference to the accompanying figures.

FIG. 1 is a block diagram of a system in which automated POST resubmission can be implemented, according to some embodiments. As shown in the diagram, the system includes a web application layer proxy 100 that is communicatively coupled between a client 110 and an origin server 120. The client 110 may access a resource (e.g., a web page or API) hosted by the origin server 120, for example, by generating one or more web application layer requests (e.g., HTTP request messages such as a "POST" HTTP request messages or "GET" HTTP request messages) and sending these web application layer requests to the origin server 120. In response to receiving web application layer requests, the origin server 120 may send corresponding web application layer responses (e.g., HTTP response messages) containing data/content to the client 110. The client 110 may render the data/contents of the web application layer responses (e.g., on a display screen for an end user) or otherwise consume the data/contents of the web application layer responses. The client 110 may be implemented using one or more client end station and the origin server 120 may be implemented using one or more server end stations. In one embodiment, the client 110 is a web browser and the server 120 is a web server. While for the sake of simplicity the diagram shows a single client 110 and a single origin server 120, it should be understood that there can be more than one client 110 accessing more than one origin server 120.

As shown in the diagram, the web application layer proxy 100 is deployed "in front" of the origin server 120 to protect the origin server 120 from attacks by clients (e.g., the client 110). In one embodiment, the web application layer proxy 100 is a reverse proxy that sits inline to the traffic being sent between the clients and the origin server 120 such that it can see the traffic being sent to the origin server 120 (and possibly see traffic being sent in the other direction by the origin server 120 to the clients). In one embodiment, the web application layer proxy 100 implements a web application firewall, a content delivery network (CDN) proxy, and/or a load balancer. The web application layer proxy 100 may be implemented using one or more network devices.

As shown in the diagram, the web application layer proxy 100 is also communicatively coupled to a bot detector component 130. The bot detector component 130 may receive analysis requests from the web application layer proxy 100 to analyze client requests (e.g., web application layer requests sent by clients to the origin server 120) received by the web application layer proxy 100 with regard to whether the requests are generated by a bot or a human user. The bot detector component 130 may be implemented using one or more network devices. While the bot detector component 130 is shown in the diagram as being implemented separately from the web application layer proxy 100, in some embodiments the bot detector component 130 may be integrated within the web application layer proxy 100. In one embodiment, the bot detector component 130 is owned/operated by an entity that is different from the entity that owns/operates the origin server 120 and/or the web application layer proxy 100. For example, the entity that owns/operates the bot detector component 130 may provide bot detection services to the entity that owns/operates the origin server 120 and/or the web application layer proxy 100. In this sense, the entity that owns/operates the origin server 120 and/or the web application layer proxy 100 may be a customer of the entity that owns/operates the bot detector component 130.

Example operations for performing automated POST resubmission will now be described with reference being made to the system shown in FIG. 1.

At operation '1' the client 110 sends a POST request to the origin server 120. At operation '2' the web application layer proxy 100 intercepts the client's request (before it reaches the origin server 120) and sends an analysis request to the bot detector component 130 to analyze the client's request (and possibly other information about the client 110) to determine whether the client 110 is operated by a bot or a human user. The analysis request may include the client's request itself, other information about the client's request, and/or information bout the client itself. For example, the analysis request may include the client's request itself (or a portion thereof), the client's Internet Protocol (IP) address, a request ID (e.g., which may be an ID assigned to the client's request by the owner/operator of the origin server 120), information about a challenge-response test (e.g., a timestamp indicating when a challenge-response test such as a CAPTCHA was solved for this client), information about recent origin server responses sent to the client 110, various statistics/metrics (e.g., statistics about the requests and responses sent between the web application layer proxy 100 and the bot detector component 130 (e.g., statistics about errors that occurred such as the number of recent analysis requests to the bot detector component 130 that have timed out), statistics about the types of suggestions/actions (e.g., block or allow) returned for GET requests and POST requests, respectively, the latency of analysis requests/responses to/from the bot detector component 130, etc.), and information about the web application layer proxy 120 that sent the analysis request (e.g., the ID of the web application layer proxy 120, the current software version being used by the web application layer proxy 120, the type of web application layer proxy 120, the uptime of the web application layer proxy 120 (e.g., the number of seconds the web application layer proxy has been in operation), etc.).

A simple example of an analysis request is provided below:

```
POST /v6/analysis HTTP/1.1
Authorization: Basic YXBpX2tleV9pZDphcGlfc2VjcmV0X2tleQ==
Content-Type: application/json
Content-Length: 445
Host: distilendpoint.example.com
User-Agent: test
{
"client_ip": "10.20.30.40",
"raw_request":
"R0VUIC8gSFRUUC8xLjENCkhvc3Q6IGF3cy1zbW9rZXRlc3Qtc3RhZ2luZy5kaXN0aWwub
mluamENClVzZXItQWdlbnQ6IE1vemlsbGEvNS4wIChNYWNpbnRvc2g7IEludGVsIE1hYyB
PUyBYIDEwLjEzOyBydjo2My4wKSBHZWNrby8yMDEwMDEwMSBGaXJlZm94LzYzLjA
NCkFjY2VwdDogdGV4dC9odG1sLGFwcGxpY2F0aW9uL3hodG1sK3htbCxhcHBsaWNhdGl
vbi94bWw7cT0wLjksKi8qO3E9MC44DQpBY2NlcHQtTGFuZ3VhZ2U6IGVuLVVTLGVuO3
E9MC41DQpBY2NlcHQtRW5jb2Rpbmc6IGd6aXAsIGRlZmxhdGUNCg0K"
}
```

At operation '3' the bot detector component 130 analyzes the client's request and sends a response to the web application layer proxy 100 indicating that the client needs to be identified/interrogated (e.g., because the request does not include a valid token—this could be because this is the first time the client 110 is accessing the origin server 120 or because the client's existing token has expired).

A simple example of a response to the analysis request is provided below:

```
HTTP/1.1 200 OK
Server: openresty/1.14.0.0
Date: Fri, 08 Feb 2019 16:08:12 GMT
Content-Type: application/json
Content-Length: 157
Connection: keep-alive
access-control-allow-origin: *
server-timing: bon, total;dur=1.553252
{
"action": "monitor",
"fingerprint": "9c81f392-8448-46b8-8c0d-210958698704",
"flags": [
   "no_token"
],
"tags": [
   "automated_browsers"
]
}
```

At operation '4' the web application layer proxy 100 obtains/generates an interstitial page, where the interstitial page includes a form with a hidden input field. At operation '5' the web application layer proxy 100 encrypts the POST data included in the client's POST request and adds it to the hidden input field of the form included in the interstitial page. The web application layer proxy 100 may encrypt the POST data using an initialization vector (IV) and a secret key. The web application layer proxy 100 may randomly (or pseudo-randomly) generate the IV each time it performs encryption such that encrypting the same message twice would yield two completely different ciphertexts, which allows the encryption scheme to be semantically secure. In one embodiment, the web application layer proxy 100 encrypts the POST data using Advanced Encryption Standard (AES) 256 (e.g., AES Cipher Blocker Chaining) or a similar encryption mechanism. At operation '6' the web application layer proxy 100 sends the interstitial page and the IV used to encrypt the POST data to the client 110. In one embodiment, the IV is sent as a cookie.

At operation '7' the client 110 loads the interstitial page and executes challenge code included therein to interrogate the client 110. The interrogation may involve, for example, fingerprinting the client to uniquely identify it, as well as performing some challenges (e.g., to ensure that the client is a real browser). While in some embodiments, the actual challenge code is embedded in the interstitial page itself, in other embodiments the challenge code is stored remotely and the interstitial page includes a reference/link to the remotely stored challenge code (e.g., using a <SCRIPT src=URL of challenge code>HTML tag). In one embodiment, the challenge code is stored at the bot detector component 130. In this case, the client 110 may send a request to the bot detector component 130 for the challenge code (e.g., indirectly via the web application layer proxy 100 or directly to the bot detector component 130).

If the bot detector component 130 determines that the client 110 is not operated by a bot, then it may generate and provide a token for the client 110. In this example, it is assumed that the bot detector component 130 determines that the client 110 is not operated by a bot and thus generates and provides a token for the client 110 (e.g., the bot detector component 130 may send the token to the client 110 as a cookie). At operation '8' the client 110 acquires the token and submits the form with the hidden input field, where the form submission includes the encrypted POST data (since it was previously added to the hidden input field of the form by the web application layer proxy 100 at operation '5'). The IV and the acquired token may also be sent along with the form submission (e.g., as cookies). It should be noted that sending the IV is not necessary (i.e., it is optional) but it may provide extra safety in the case that the interstitial page gets cached by a proxy somewhere (e.g., because that proxy does not adhere to cache directives/policies) and served to another client. With the IV, if a different client submits the same form using a cached version of the interstitial page, the web application layer proxy 100 can determine that the submission is invalid if the submission does not include the correct IV to decrypt the POST data. It should also be noted that the secret key that was used to encrypt the POST data may be kept secret and not shared outside of the web application layer proxy 100.

At operation '9' the web application layer proxy 100 intercepts the form submission and identifies the form submission as being a POST resubmission (e.g., based on the existence of the hidden input field in the form). In response, the web application layer proxy 100 may send an analysis request to the bot detector component 130 to analyze the client's request (i.e., the form submission). This time, the bot detector component 130 may send a response to the web application layer proxy 100 indicating that the client 110 is not operated by a bot because the client 110 has acquired a valid token. In response, at operation '10' the web application layer proxy 100 decrypts the encrypted POST data (e.g., using the IV and the secret key). At operation '11' the web application layer proxy 100 reconstructs the client's original request using the decrypted POST data and at operation '12' sends the client's reconstructed request to the origin server 120. It should be noted that in this example the bot detector component 130 determined that the client 110 is not operated by a bot because the client has acquired a valid token. If the bot detector component 130 had instead determined that the client 110 is operated by a bot then it may have instead sent a response to the web application layer proxy 100 indicating that the client should be blocked (or that the web application layer proxy 100 should take some other action to restrict access of the client 110 or should further verify the client's legitimacy) and the web application layer proxy 100 may have sent a corresponding response to the client 110 (e.g., a response indicating that access is unauthorized (e.g. a 401 unauthorized page)).

At operation '13' the origin server 120 receives the reconstructed request and at operation '14' generates and sends a response to the reconstructed request to the client 110. At operation '15' the client receives and processes the response.

As a result of these operations, the client 110 is able to seamlessly receive a response to its original POST request if the bot detector component 130 determines that the client 110 is not operated by a bot. The operations may be transparent to the user of the client 110 in that the user may not even be aware of the interstitial page and the interrogation being performed on the client 110. Since embodiments perform a POST resubmit instead of relying on performing a page reload, they work consistently across different types of clients even if those clients handle page reloads for POST requests differently. Also, embodiments may send/receive the POST data (which may include potentially sensitive information (e.g., login credentials, credit card numbers, etc.)) to/from the client 110 in encrypted form without having to store the POST data at the web application layer proxy 100 (at least not in any permanent way) and/or without sending the POST data to the bot detector component 130, which helps safeguard information (e.g., sending the POST data to the bot detector component 130 may be undesirable particularly if the bot detector component 130 is owned/operated by a different entity from the entity that owns/operates the origin server 120 and/or the web application layer proxy 100).

Figure 2:
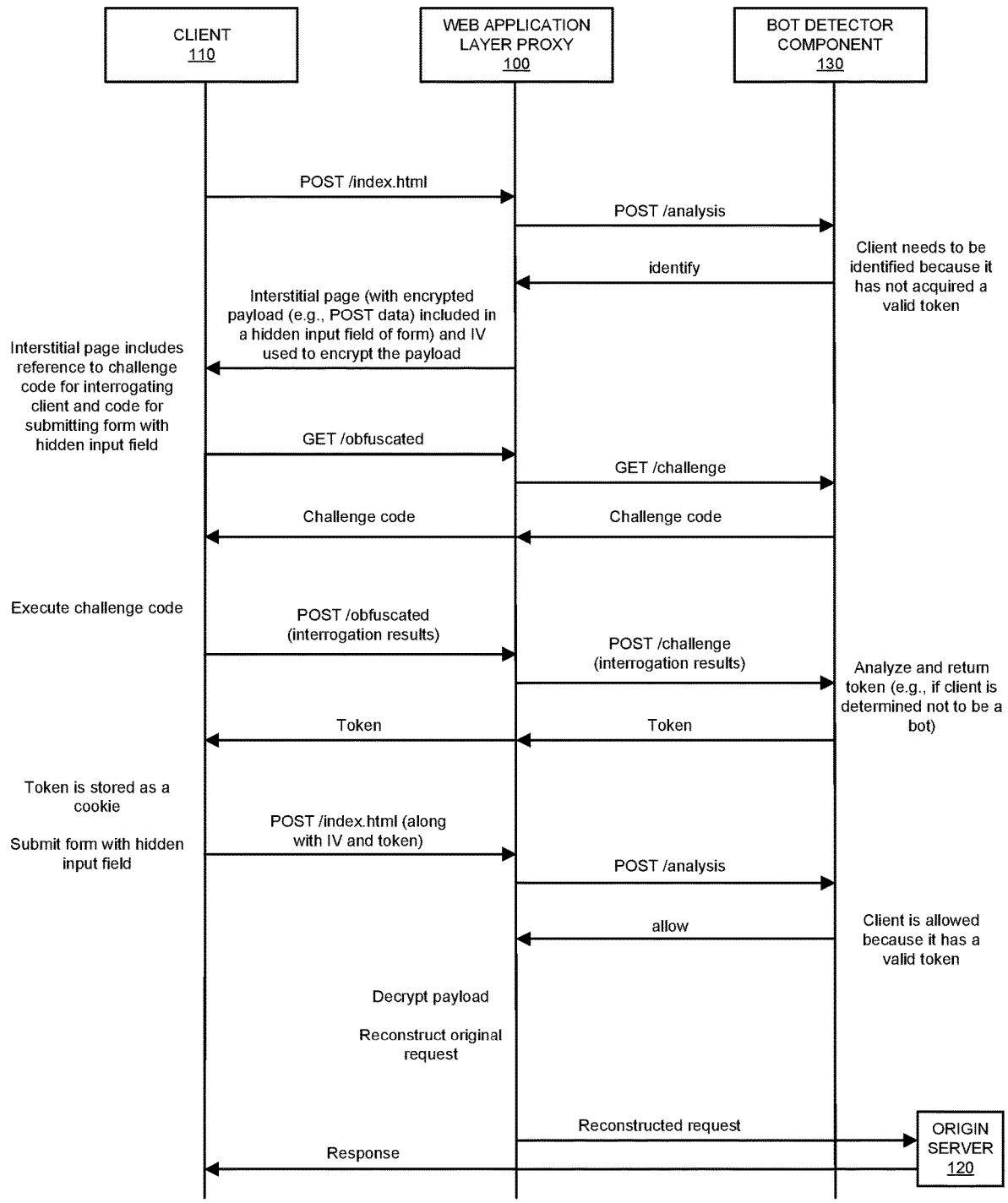
FIG. 2 is a diagram illustrating interactions between the client, the web application layer proxy, and the origin server, according to some embodiments.

FIG. 2 is a diagram illustrating interactions between the client, the web application layer proxy, and the origin server, according to some embodiments. As shown in the diagram, the client 110 sends a POST request to the origin server 120 for the web page "/index.html." The web application layer proxy 100 intercepts the client's request and sends a POST request (an analysis request) to the "/analysis" endpoint of the bot detector component 130. The bot detector component 130 analyzes the client's request to determine whether the client is operated by a bot. In this example the bot detector 130 determines that the client 110 needs to be identified because it has not acquired a valid token. Thus, the bot detector component 130 sends a response to the web application layer proxy 100 indicating that the client 110 needs to be identified. The web application layer proxy 100 generates/obtains an interstitial page, encrypts the payload of the client's request (e.g., the POST data included in the client's request) using an IV and a secret key, adds the encrypted payload to a hidden input field of a form included in the interstitial page, and sends the interstitial page to the client 110 along with the IV used to encrypt the payload of the client's request as a cookie. The interstitial page includes challenge code for interrogating the client 110 (e.g., via a <SCRIPT src=URL of challenge code> HTML tag) and code for submitting the form with the hidden in put field if the client successfully acquires a token. The client 110 loads the interstitial page and sends a GET request to the "/obfuscated" endpoint of the web application layer proxy 100 for the challenge code (it should be noted that "/obfuscated" and the other endpoint names used in this example are merely examples and that in practical implementations it may be desirable to use endpoint names that do not hint at the functionality behind the endpoints to improve security). In response, the web application layer proxy 100 sends a GET request to the "/challenge" endpoint of the bot detector component 130 for the challenge code. In response, the bot detector component 130 sends the challenge code to the web application layer proxy 100, which in turn sends the challenge code to the client 110. The client 110 executes the challenge code, which involves interrogating the client 110. The client 110 then sends a POST request to the "/obfuscated" endpoint of the web application layer proxy 100 that includes the results of the interrogation. The web application layer proxy 100 sends the results of the interrogation to the "/challenge" endpoint of the bot detector component 130 for analysis. The bot detector component 130 then analyzes the results of the interrogation and generates and provides a token for the client 110 if it determines that the client 110 is not operated by a bot. In this example, the bot detector component 130 determines that the client 110 is not operated by a bot and thus generates a token for the client 110 and sends the token to the web application layer proxy 100, which in turn sends the token to the client 110. The client 110 stores the token as a cookie and submits the form with the hidden input field. This results in a POST request along with the IV and the token being sent to the origin server 120. The web application layer proxy 100 intercepts this request and sends a POST request to the "/analysis" endpoint of the bot detector component 130 to analyze the client's request. This time the bot detector component 130 determines that the client 110 is not operated by a bot because it has acquired a valid token, and thus is allowed to access the origin server 120. Thus, the bot detector component 130 sends a response to the web application layer proxy 100 indicating that the client 110 is not operated by a bot and is allowed access the origin server 120. In response, the web application layer proxy 100 decrypts the payload using the IV and the secret key and reconstructs the original request using the decrypted payload. The web application layer proxy 100 then sends the reconstructed request to the origin server 120. The origin server 120 then generates and sends a response to the reconstructed request to the client 110.

Figure 3:
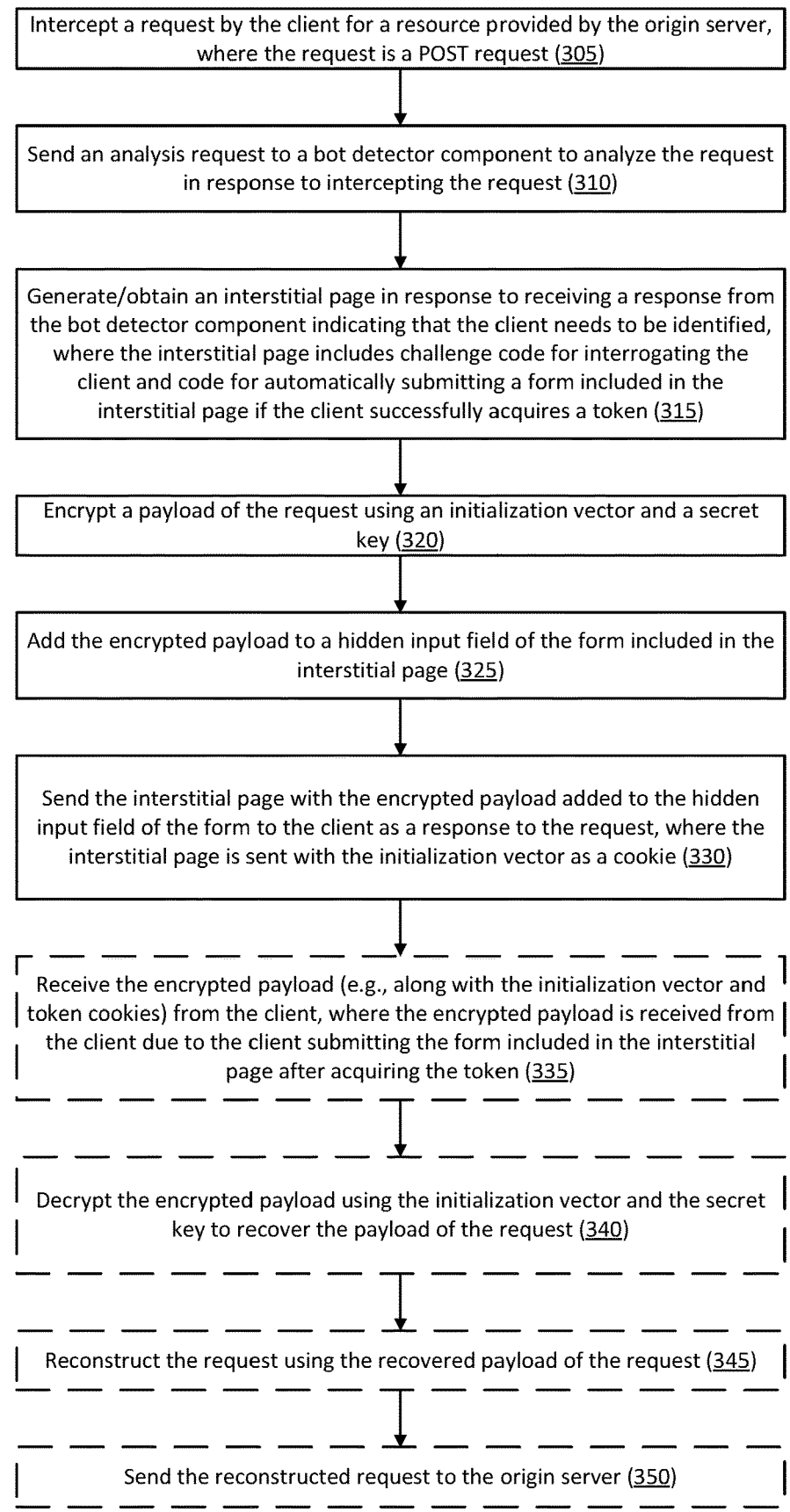
FIG. 3 is a flow diagram of a process for performing automated POST resubmission, according to some embodiments.

FIG. 3 is a flow diagram of a process for performing automated POST resubmission, according to some embodiments. In one embodiment, the process is implemented by a network device implementing a web application layer proxy that is communicatively coupled between a client and an origin server. The web application layer proxy may be, for example, a content distribution network (CDN) proxy, a web application firewall (or other type of network security device), and/or a load balancer. The process may be implemented using hardware, software, firmware, or any combination thereof.

The operations in the flow diagram are described with reference to the exemplary embodiments of the other diagrams. However, it should be understood that the operations of the flow diagram can be performed by embodiments of the invention other than those discussed with reference to these other diagrams, and the embodiments of the invention discussed with reference these other diagrams can perform operations different than those discussed with reference to the flow diagram.

Similarly, while the flow diagram shows a particular order of operations performed by certain embodiments, it should be understood that such order is provided by way of example only (e.g., alternative embodiments may perform the operations in a different order, combine certain operations, overlap certain operations, etc.).

At block 305, the web application layer proxy intercepts a request by the client for a resource (e.g., a web page) provided by the origin server, where the request is an HTTP POST request (as opposed to an HTTP GET request).

At block 310, the web application layer proxy sends an analysis request to a bot detector component to analyze the request in response to intercepting the request.

At block 315, the web application layer proxy generates/obtains an interstitial page in response to receiving a response from the bot detector component indicating that the client needs to be identified, where the interstitial page includes challenge code for interrogating the client and code for automatically submitting a form included in the interstitial page if the client successfully acquires a token. In one embodiment, the bot detector component determines that the client needs to be identified because the client has not acquired a valid token. In one embodiment, the challenge code is included in the interstitial page using a script tag (e.g., HTML "<SCRIPT>" tag) that references a (remote) location (e.g., URL) of the challenge code. In one embodiment, the challenge code includes code for obtaining information about the client (e.g., which fonts are installed) and sending the information about the client to the bot detector component for analysis.

At block 320, the web application layer proxy encrypts a payload of the request (e.g., POST data) using an initialization vector (e.g., which is generated randomly or pseudo-randomly) and a secret key. In one embodiment, the payload is encrypted using AES 256.

At block 325, the web application layer proxy adds the encrypted payload to a hidden input field of the form included in the interstitial page. In one embodiment, the payload of the request is encrypted and added to the hidden input field of the form included in the interstitial page in response to a determination by the web application layer proxy that the request is a POST request as opposed to a GET request.

At block 330, the web application layer proxy sends the interstitial page with the encrypted payload added to the hidden input field of the form to the client as a response to the request, where the interstitial page is sent with the initialization vector (that was used to encrypt the payload) as a cookie.

In one embodiment, at block 335, the web application layer proxy receives the encrypted payload (e.g., along with the initialization vector and token as cookies), where the encrypted payload is received from the client due to the client submitting the form included in the interstitial page after acquiring the token.

In one embodiment, at block 340, the web application layer proxy decrypts the encrypted payload using the initialization vector and the secret key to recover the (original) payload of the request.

In one embodiment, at block 345, the web application layer proxy reconstructs the request using the recovered payload of the request.

In one embodiment, at block 350, the web application layer proxy sends the reconstructed request to the origin server.

In one embodiment, the web application layer proxy intercepts a further request by the client for a resource provided by the origin server, where the further request is sent with the token as a cookie. The web application layer proxy then sends a further analysis request to the bot detector component to analyze the further request in response to intercepting the further request. The web application layer proxy sends the further request to the origin server in response to receiving a response from the bot detector component that the client is not operated by a bot, where the bot detector determines that the client is not operated by a bot based on a determination that the token acquired by the client is valid.

Figure 4:
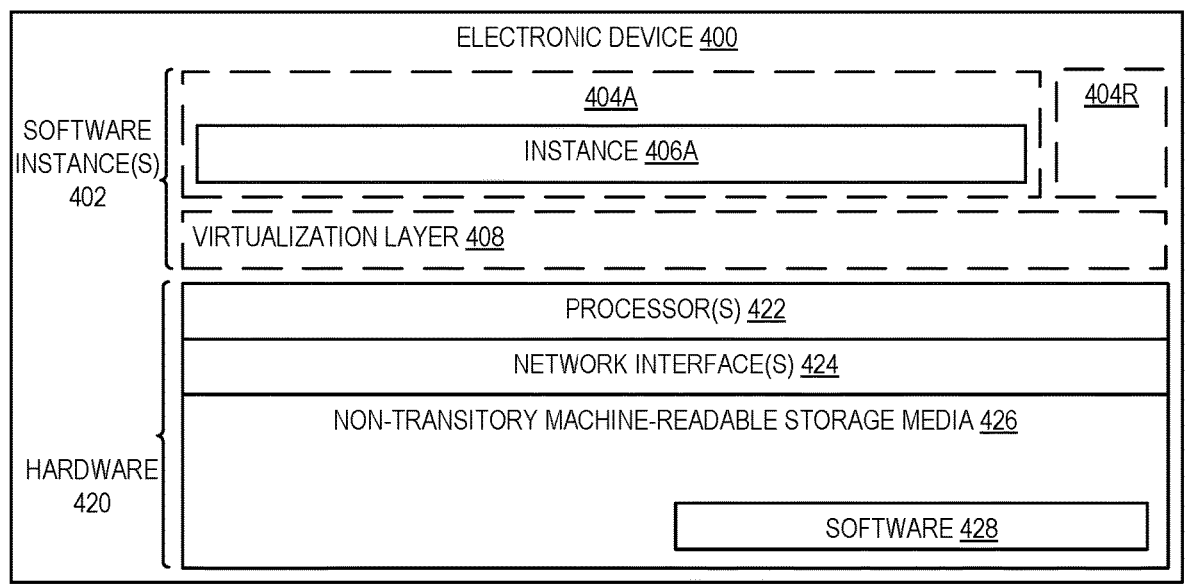
FIG. 4 is a block diagram illustrating an electronic device, according to some embodiments.

FIG. 4 is a block diagram illustrating an electronic device, according to some embodiments. FIG. 4 illustrates hardware 420 comprising a set of one or more processor(s) 422, a set of one or more network interfaces 424 (wireless and/or wired), and non-transitory machine-readable storage medium/media 426 having stored therein software 428 (which includes instructions executable by the set of one or more processor(s) 422). Software 428 can include code, which when executed by hardware 420, causes the electronic device 400 to perform operations of one or more embodiments described herein (e.g., operations for forcing identification).

In electronic devices that use compute virtualization, the set of one or more processor(s) 422 typically execute software to instantiate a virtualization layer 408 and software container(s) 404A-R (e.g., with operating system-level virtualization, the virtualization layer 408 represents the kernel of an operating system (or a shim executing on a base operating system) that allows for the creation of multiple software containers 404A-R (representing separate user space instances and also called virtualization engines, virtual private servers, or jails) that may each be used to execute a set of one or more applications; with full virtualization, the virtualization layer 408 represents a hypervisor (sometimes referred to as a virtual machine monitor (VMM)) or a hypervisor executing on top of a host operating system, and the software containers 404A-R each represent a tightly isolated form of a software container called a virtual machine that is run by the hypervisor and may include a guest operating system; with para-virtualization, an operating system or application running with a virtual machine may be aware of the presence of virtualization for optimization purposes). Again, in electronic devices where compute virtualization is used, during operation an instance of the software 428 (illustrated as instance 406A) is executed within the software container 404A on the virtualization layer 408. In electronic devices where compute virtualization is not used, the instance 406A on top of a host operating system is executed on the "bare metal" electronic device 400. The instantiation of the instance 406A, as well as the virtualization layer 408 and software containers 404A-R if implemented, are collectively referred to as software instance(s) 402.

Alternative implementations of an electronic device may have numerous variations from that described above. For example, customized hardware and/or accelerators might also be used in an electronic device.

The techniques shown in the figures can be implemented using code and data stored and executed on one or more electronic devices (e.g., an end station, a network device). Such electronic devices, which are also referred to as computing devices, store and communicate (internally and/or with other electronic devices over a network) code and data using computer-readable media, such as non-transitory machine-readable storage media (e.g., magnetic disks, optical disks, random access memory (RAM), read-only memory (ROM); flash memory, phase-change memory) and transitory computer-readable communication media (e.g., electrical, optical, acoustical or other form of propagated signals, such as carrier waves, infrared signals, digital signals). In addition, electronic devices include hardware, such as a set of one or more processors coupled to one or more other components, e.g., one or more non-transitory machine-readable storage media to store code and/or data, and a set of one or more wired or wireless network interfaces allowing the electronic device to transmit data to and receive data from other computing devices, typically across one or more networks (e.g., Local Area Networks (LANs), the Internet). The coupling of the set of processors and other components is typically through one or more interconnects within the electronic device, (e.g., busses, bridges). Thus, the non-transitory machine-readable storage media of a given electronic device typically stores code (i.e., instructions) for execution on the set of one or more processors of that electronic device. Of course, various parts of the various embodiments presented herein can be implemented using different combinations of software, firmware, and/or hardware. As used herein, a network device (e.g., a router, switch, bridge) is an electronic device that is a piece of networking equipment, including hardware and software, which communicatively interconnects other equipment on the network (e.g., other network devices, end stations). Some network devices are "multiple services network devices" that provide support for multiple networking functions (e.g., routing, bridging, switching), and/or provide support for multiple application services (e.g., data, voice, and video).

While the invention has been described in terms of several embodiments, those skilled in the art will recognize that the invention is not limited to the embodiments described, can be practiced with modification and alteration within the spirit and scope of the appended embodiments/claims. The description is thus to be regarded as illustrative instead of limiting.

What is claimed is:

1. A method by a network device implementing a web application layer proxy communicatively coupled between a client and an origin server for performing automated POST resubmission, the method comprising:
    intercepting a request by the client for a resource provided by the origin server, wherein the request is a POST request;
    sending an analysis request to a bot detector component to analyze the request in response to intercepting the request;
    obtain an interstitial page in response to receiving a response from the bot detector component indicating that the client needs to be identified, wherein the interstitial page includes challenge code for interrogating the client and code for automatically submitting a form included in the interstitial page if the client successfully acquires a token;
    encrypting a payload of the request using an initialization vector and a secret key;
    adding the encrypted payload to a hidden input field of the form included in the interstitial page; and
    sending the interstitial page with the encrypted payload added to the hidden input field of the form to the client as a response to the request, wherein the interstitial page is sent with the initialization vector as a cookie.

2. The method of claim 1, further comprising:
    receiving the encrypted payload from the client, wherein the encrypted payload is received from the client due to the client submitting the form included in the interstitial page after acquiring the token;
    decrypting the encrypted payload using the initialization vector and the secret key to recover the payload of the request;
    reconstructing the request using the recovered payload of the request; and
    sending the reconstructed request to the origin server.

3. The method of claim 2, further comprising:
receiving the initialization vector from the client as a cookie along with the encrypted payload.

4. The method of claim 1, wherein the payload is encrypted using Advanced Encryption Standard (AES) 256.

5. The method of claim 1, wherein the challenge code includes code for obtaining information about the client and sending the information about the client to the bot detector component for analysis.

6. The method of claim 1, further comprising:
intercepting a further request by the client for a resource provided by the origin server, wherein the further request is sent with the token as a cookie;
sending a further analysis request to the bot detector component to analyze the further request in response to intercepting the further request; and
forwarding the further request to the origin server in response to receiving a response from the bot detector component that the client is not operated by a bot, wherein the bot detector determines that the client is not operated by a bot based on a determination that the token acquired by the client is valid.

7. The method of claim 1, wherein the payload of the request is encrypted and added to the hidden input field of the form included in the interstitial page in response to a determination by the web application layer proxy that the request is a POST request as opposed to a GET request.

8. The method of claim 1, wherein the bot detector component determines that the client needs to be identified because the client has not acquired a valid token.

9. The method of claim 1, wherein the web application layer proxy is a content distribution network (CDN) proxy, a web application firewall, or a load balancer.

10. The method of claim 1, wherein the challenge code is included in the interstitial page using a script tag that references a location of the challenge code.

11. A network device configured to implement a web application layer proxy that is to be communicatively coupled between a client and an origin server to perform automated POST resubmission, the network device comprising:
one or more processors; and
a non-transitory machine-readable storage medium having instructions stored therein, which when executed by the one or more processors, causes the network device to:
intercept a request by the client for a resource provided by the origin server, wherein the request is a POST request,
send an analysis request to a bot detector component to analyze the request in response to intercepting the request,
obtain an interstitial page in response to receiving a response from the bot detector component indicating that the client needs to be identified, wherein the interstitial page includes challenge code for interrogating the client and code for automatically submitting a form included in the interstitial page if the client successfully acquires a token,
encrypt a payload of the request using an initialization vector and a secret key,
add the encrypted payload to a hidden input field of the form included in the interstitial page, and
send the interstitial page with the encrypted payload added to the hidden input field of the form to the client as a response to the request, wherein the interstitial page is sent with the initialization vector as a cookie.

12. The network device of claim 11, wherein the instructions, when executed by the one or more processors, further causes the network device to:
receive the encrypted payload from the client, wherein the encrypted payload is received from the client due to the client submitting the form included in the interstitial page after acquiring the token,
decrypt the encrypted payload using the initialization vector and the secret key to recover the payload of the request,
reconstruct the request using the recovered payload of the request, and
send the reconstructed request to the origin server.

13. The network device of claim 12, wherein the instructions, when executed by the one or more processors, further causes the network device to:
receiving the initialization vector from the client as a cookie along with the encrypted payload.

14. The network device of claim 11, wherein the payload is encrypted using Advanced Encryption Standard (AES) 256.

15. The network device of claim 11, wherein the challenge code includes code for obtaining information about the client and sending the information about the client to the bot detector component for analysis.

16. A non-transitory machine-readable storage medium that provides instructions that, if executed by a processor of a network device implementing a web application layer proxy that is communicatively coupled between a client and an origin server, causes the network device to perform operations comprising:
intercepting a request by the client for a resource provided by the origin server, wherein the request is a POST request;
sending an analysis request to a bot detector component to analyze the request in response to intercepting the request;
generating an interstitial page in response to receiving a response from the bot detector component indicating that the client needs to be identified, wherein the interstitial page includes challenge code for interrogating the client and code for automatically submitting a form included in the interstitial page if the client successfully acquires a token;
encrypting a payload of the request using an initialization vector and a secret key;
adding the encrypted payload to a hidden input field of the form included in the interstitial page; and
sending the interstitial page with the encrypted payload added to the hidden input field of the form to the client as a response to the request, wherein the interstitial page is sent with the initialization vector as a cookie.

17. The non-transitory machine-readable storage medium of claim 16, wherein the operations further comprise:
receiving the encrypted payload from the client, wherein the encrypted payload is received from the client due to the client submitting the form included in the interstitial page after acquiring the token;
decrypting the encrypted payload using the initialization vector and the secret key to recover the payload of the request;
reconstructing the request using the recovered payload of the request; and
sending the reconstructed request to the origin server.

18. The non-transitory machine-readable storage medium of claim 17, wherein the operations further comprise:
receiving the initialization vector from the client as a cookie along with the encrypted payload.

19. The non-transitory machine-readable storage medium of claim 16, wherein the operations further comprise:
intercepting a further request by the client for a resource provided by the origin server, wherein the further request is sent with the token as a cookie;
sending a further analysis request to the bot detector component to analyze the further request in response to intercepting the further request; and
forwarding the further request to the origin server in response to receiving a response from the bot detector component that the client is not operated by a bot, wherein the bot detector determines that the client is not operated by a bot based on a determination that the token acquired by the client is valid.

20. The non-transitory machine-readable storage medium of claim 16, wherein the payload of the request is encrypted and added to the hidden input field of the form included in the interstitial page in response to a determination by the web application layer proxy that the request is a POST request as opposed to a GET request.

* * * * *